US011760334B2

(12) United States Patent
Yokoyama et al.

(10) Patent No.: US 11,760,334 B2
(45) Date of Patent: Sep. 19, 2023

(54) CONTROL DEVICE OF VEHICLE AND INTERNAL COMBUSTION ENGINE CONTROL DEVICE

(71) Applicant: TOYOTA JIDOSHA KABUSHIKI KAISHA, Aichi-ken (JP)

(72) Inventors: Daiki Yokoyama, Gotemba (JP); Hiroya Chiba, Susono (JP); Yoshiyuki Kageura, Shizuoka-ken (JP); Masanori Shimada, Susono (JP); Yoshihiro Sakayanagi, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 143 days.

(21) Appl. No.: 17/538,949

(22) Filed: Nov. 30, 2021

(65) Prior Publication Data
US 2022/0169234 A1     Jun. 2, 2022

(30) Foreign Application Priority Data

Dec. 1, 2020  (JP) .................................. 2020-199635

(51) Int. Cl.
*B60W 20/12*     (2016.01)
*B60W 20/16*     (2016.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
CPC ...... B60W 20/12; B60W 10/06; B60W 10/08; B60W 10/26; B60W 20/16; B60W 2555/80; B60W 2556/50; B60W 2556/65; B60W 2710/244; B60W 2756/10; B60W 2510/244; B60W 2556/45; B60W 20/17;
(Continued)

(56) References Cited

U.S. PATENT DOCUMENTS 5,815,824 A * 9/1998 Saga ..................... B60W 20/00
                                                            180/65.245
5,818,116 A * 10/1998 Nakae .................... B60K 6/445
                                                            903/903
(Continued)

FOREIGN PATENT DOCUMENTS

EP      3480046 A1    5/2019
EP      3974221 A1    3/2022
(Continued)

*Primary Examiner* — Sizo B Vilakazi
*Assistant Examiner* — Brian R Kirby
(74) *Attorney, Agent, or Firm* — HAUPTMAN HAM, LLP

(57) ABSTRACT

The control device of a vehicle includes a position estimating part configured to estimate a position of the vehicle, and a power output part configured to control the internal combustion engine and the electric motor to output power for running use. The power output part is configured to determine a startup position of the internal combustion engine of the vehicle when the vehicle exits from a low emission zone requesting the internal combustion engine be stopped so that startup positions of internal combustion engines of a plurality of vehicles are dispersed at surroundings of the low emission zone.

4 Claims, 13 Drawing Sheets

(51) Int. Cl.
    *B60W 10/06*         (2006.01)
    *B60W 10/08*         (2006.01)
    *B60W 10/26*         (2006.01)

(52) U.S. Cl.
    CPC ......... *B60W 20/16* (2016.01); *B60W 2555/80* (2020.02); *B60W 2556/50* (2020.02); *B60W 2556/65* (2020.02); *B60W 2710/244* (2013.01); *B60W 2756/10* (2020.02)

(58) Field of Classification Search
    CPC ......... F02N 2200/061; F02N 2200/123; F02N 2200/125; F02N 2300/306; F02N 11/0818; Y02T 10/70; Y02T 10/72
    USPC ............................................. 701/22, 112, 113
    See application file for complete search history.

(56) References Cited

U.S. PATENT DOCUMENTS

| | | | | |
|---|---|---|---|---|
| 6,098,734 | A * | 8/2000 | Kawamura | B60L 50/40 180/65.245 |
| 7,222,004 | B2 * | 5/2007 | Anderson | G01C 21/3461 180/65.265 |
| 9,469,289 | B2 * | 10/2016 | Yu | B60W 10/06 |
| 10,787,165 | B2 * | 9/2020 | Park | B60W 10/26 |
| 2003/0078707 | A1 * | 4/2003 | Shioda | B60L 50/16 903/917 |
| 2007/0124037 | A1 * | 5/2007 | Moran | B60W 10/06 701/22 |
| 2010/0268438 | A1 * | 10/2010 | Hiranuma | B60W 20/00 60/303 |
| 2012/0029730 | A1 * | 2/2012 | Nagura | G08G 1/096725 701/2 |
| 2015/0197235 | A1 * | 7/2015 | Yu | B60W 10/08 903/903 |
| 2015/0217752 | A1 * | 8/2015 | Rueger | B60W 20/15 701/22 |
| 2018/0281772 | A1 * | 10/2018 | Hilliard | B60L 50/60 |
| 2018/0319400 | A1 * | 11/2018 | Kleinau | H04W 4/46 |
| 2018/0372053 | A1 * | 12/2018 | Kuretake | F02N 11/0837 |
| 2019/0126910 | A1 * | 5/2019 | Kim | B60W 20/16 |
| 2020/0094809 | A1 * | 3/2020 | Payne | B60W 20/20 |

FOREIGN PATENT DOCUMENTS

| | | | | |
|---|---|---|---|---|
| EP | 3974267 | A1 | 3/2022 | |
| JP | H775210 | A | 3/1995 | |
| JP | 2003206781 | A * | 7/2003 | .......... F02N 11/0837 |
| JP | 2004153929 | A * | 5/2004 | ............. B60Q 5/008 |
| JP | 2015-209096 | A | 11/2015 | |
| JP | 2015209096 | A * | 11/2015 | |
| JP | 2015-227145 | A | 12/2015 | |
| JP | 2020-104755 | A | 7/2020 | |

* cited by examiner

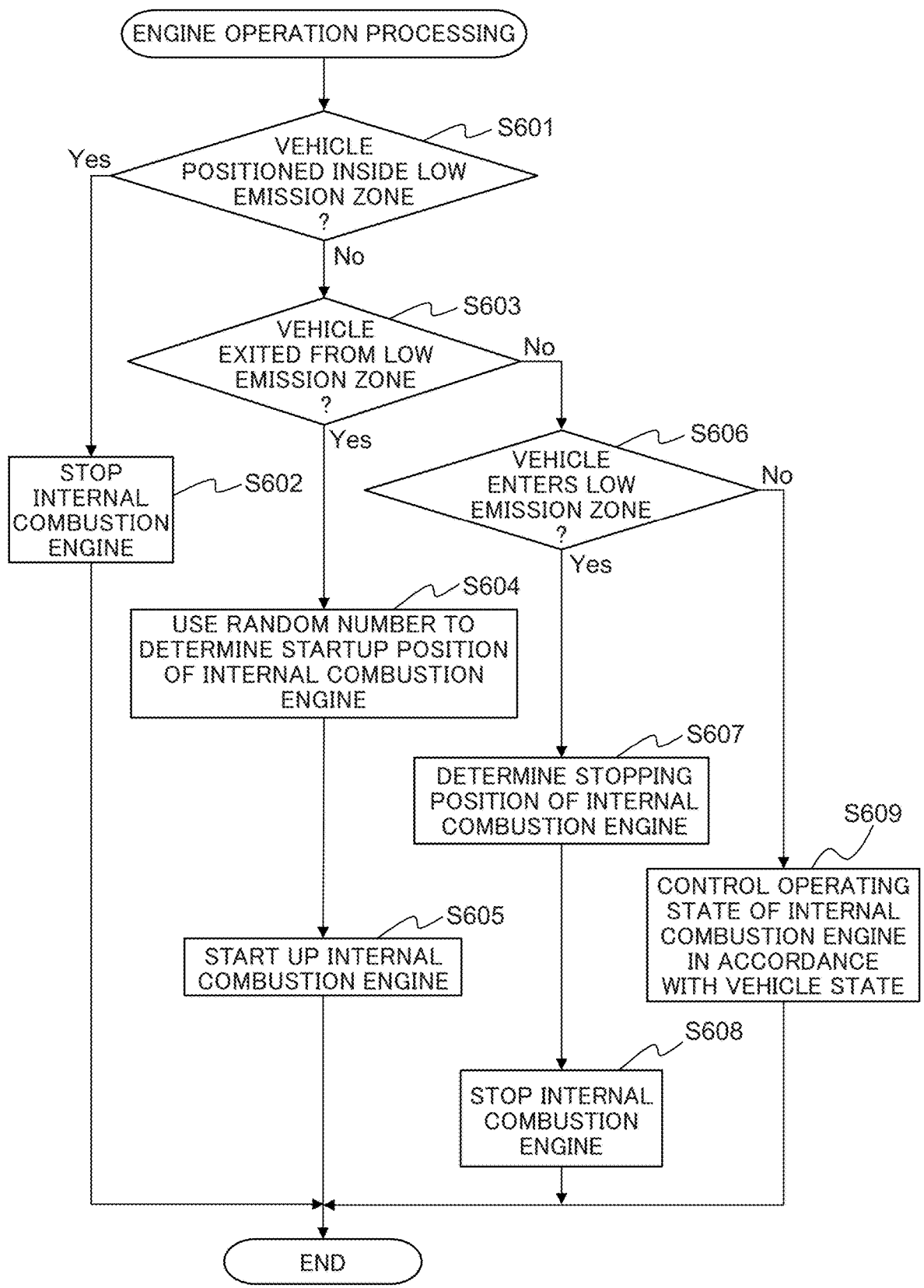

CONTROL DEVICE OF VEHICLE AND INTERNAL COMBUSTION ENGINE CONTROL DEVICE

RELATED APPLICATIONS

The present application claims priority of Japanese Patent Application No. 2020-199635 filed Dec. 1, 2020, the disclosure of which is hereby incorporated by reference herein in its entirety.

FIELD

The present disclosure relates to a control device of a vehicle and an internal combustion engine control device.

BACKGROUND

In recent years, in order to curb air pollution, low emission zones (LEZ) which require a vehicle to stop its internal combustion engine when driving through them have been established in locations such as urban areas with large amounts of traffic. When a vehicle provided with an internal combustion engine and an electric motor as sources of power for running use is driving through such a low emission zone, it is necessary to stop the internal combustion engine and use only the electric motor to output power for driving use.

In this regard, PTL 1 discloses making the internal combustion engine stop if it is judged that the position of the vehicle is within a low emission zone ("reinforced air pollution preventing region" in PTL 1).

CITATIONS LIST

Patent Literature

[PTL 1] Japanese Unexamined Patent Publication No. 07-075210

SUMMARY

Technical Problem

That is, in a low emission zone, only the electric motor is driven for outputting the power for running use, and thus the amount of electric power consumed when running becomes larger. For this reason, after a vehicle has exited from the low emission zone, the internal combustion engine has to be made to operate so as to charge the battery of the vehicle. However, if internal combustion engines are started in many vehicles in the vicinity of the boundary of the low emission zone, the noise, exhaust emissions, etc. are liable to adversely impact the environment in the vicinity of the boundary of the low emission zone.

Therefore, in consideration of the above problem, an object of the present disclosure is to keep down the adverse impact on the environment in the surroundings of a border of a low emission zone where internal combustion engines are requested to be stopped.

Solution to Problem

The summary of the present disclosure is as follows.

(1) A control device of a vehicle which is installed in a vehicle provided with an internal combustion engine, an electric motor, and a battery and which controls the vehicle, comprising: a position estimating part configured to estimate a position of the vehicle; and a power output part configured to control the internal combustion engine and the electric motor to output power for running use, wherein the power output part is configured to determine a startup position of the internal combustion engine of the vehicle when the vehicle exits from a low emission zone requesting the internal combustion engine be stopped so that startup positions of internal combustion engines of a plurality of vehicles are dispersed at surroundings of the low emission zone.

(2) The control device of a vehicle described in above (1), wherein the power output part is configured to use a random number to determine the startup position of the internal combustion engine of the vehicle when the vehicle exits from the low emission zone.

(3) The control device of a vehicle described in above (1), wherein the vehicle further comprises a vehicle-to-vehicle communicator, and the power output part is configured to use vehicle-to-vehicle communication with other vehicles to determine the startup position of the internal combustion engine of the vehicle when the vehicle exits from the low emission zone so that the startup position of the internal combustion engine of the vehicle does not overlap the startup positions of the internal combustion engines of the other vehicles in the surroundings of the low emission zone.

(4) The control device of a vehicle described in above (1), wherein the power output part is configured to determine the startup position of the internal combustion engine of the vehicle when the vehicle exits from the low emission zone in accordance with predetermined conditions.

(5) The control device of a vehicle described in above (4), wherein the predetermined conditions include a time or day of week when the vehicle exits from the low emission zone or an identification information of the vehicle.

(6) The control device of a vehicle described in above (4), further comprising a state of charge calculating part configured to calculate a state of charge of the battery, wherein the predetermined conditions include the state of charge of the battery when the vehicle exits from the low emission zone.

(7) The control device of a vehicle described in above (1), wherein the vehicle further comprises a communication device able to communicate with a server, and the power output part is configured to determine the startup position of the internal combustion engine of the vehicle when the vehicle exits from the low emission zone in accordance with a control command from the server.

(8) The control device of a vehicle described in above any one of (1) to (7), wherein the power output part is configured to make the internal combustion engine of the vehicle start up when the vehicle exits from the low emission zone, then gradually make an output of the internal combustion engine increase.

(9) The control device of a vehicle described in above any one of (1) to (8), wherein the power output part is configured to determine a stopping position of the internal combustion engine of the vehicle when the vehicle enters the low emission zone so that stopping positions of internal combustion engines of a plurality of vehicles are dispersed at the surroundings of the low emission zone.

(10) An internal combustion engine control device comprising: a communication device able to communicate with a plurality of vehicles; and a control device, wherein each of the plurality of vehicles comprises an internal combustion engine, an electric motor, and a battery, and the control device is configured to determine a startup position of the internal combustion engine when each of the plurality of vehicles exits from a low emission zone requesting the internal combustion engines be stopped so that the startup positions of the internal combustion engines of the plurality of vehicles are dispersed at surroundings of the low emission zone and transmit the startup position as a control command through the communication device to each of the plurality of vehicles.

(11) The internal combustion engine control device described in above (10), wherein the control device is configured to determine the startup position of the internal combustion engine when each of the plurality of vehicles exits from the low emission zone so that in the surroundings of the low emission zone, the further away a position from a boundary of the low emission zone, the higher a ratio of vehicles whose internal combustion engines have finished being started up among the vehicles exiting from the low emission zone.

Advantageous Effects of Invention

According to the present disclosure, it is possible to keep down the adverse impact on the environment in the surroundings of a border of a low emission zone where internal combustion engines are requested to be stopped.

BRIEF DESCRIPTION OF DRAWINGS

FIG. 13 is a flow chart showing a control routine of engine operation processing in a fifth embodiment of the present disclosure.

DESCRIPTION OF EMBODIMENTS

Figure 1:
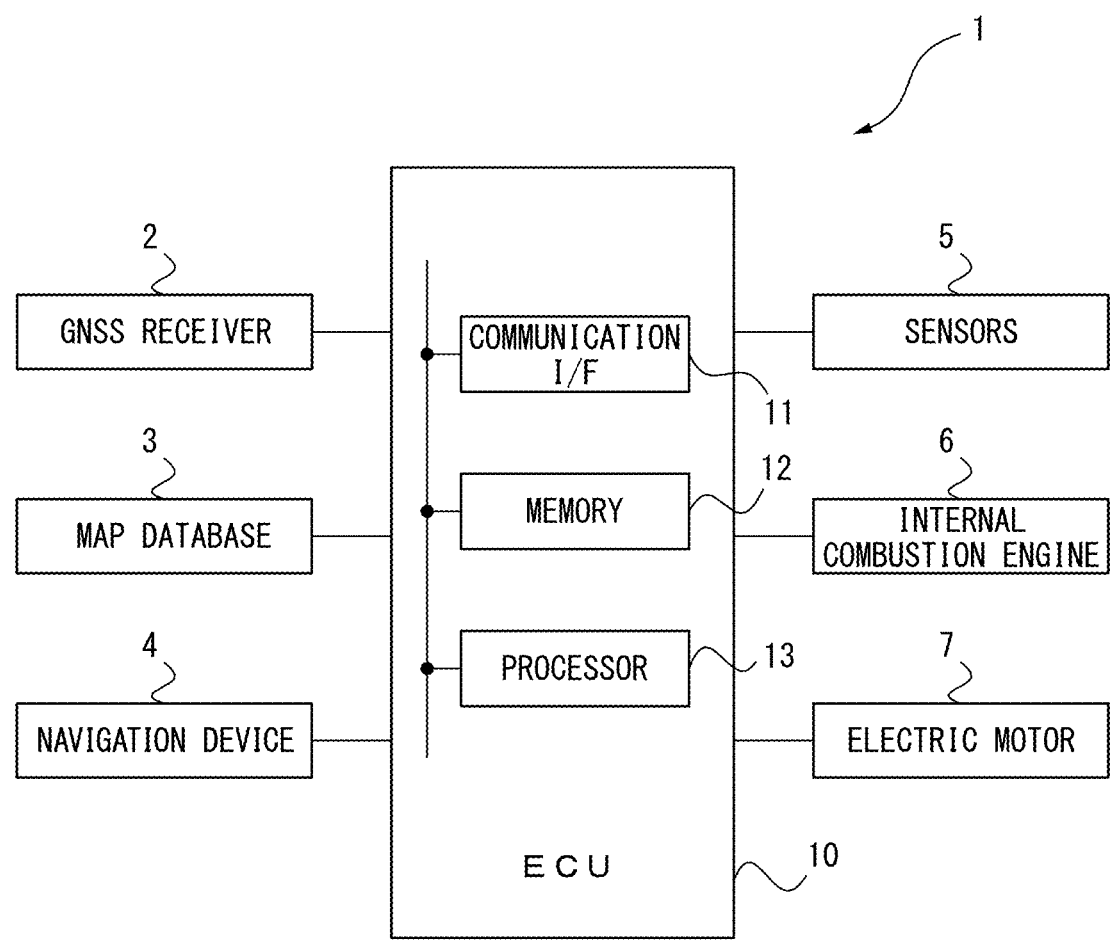
FIG. 1 is a view schematically showing the configuration of a vehicle to which a control device of a vehicle according to a first embodiment of the present disclosure is applied.

Below, referring to the drawings, embodiments of the present disclosure will be explained in detail. Note that, in the following explanation, similar component elements will be assigned the same reference notations.

First Embodiment

First, referring to FIG. 1 to FIG. 4, a first embodiment of the present disclosure will be explained.

Explanation of Vehicle as a Whole

FIG. 1 is a view schematically showing the configuration of a vehicle to which a control device of a vehicle according to the first embodiment of the present disclosure is applied. As shown in FIG. 1, the vehicle 1 is provided with a GNSS receiver 2, a map database 3, a navigation device 4, sensors 5, an internal combustion engine 6, an electric motor 7, and an electronic control unit (ECU) 10. The GNSS receiver 2, the map database 3, the navigation device 4, the sensors 5, the internal combustion engine 6, and the electric motor 7 are connected to be able to communicate with the ECU 10 through an internal vehicle network based on the CAN (Controller Area Network) or other standard.

The GNSS receiver 2 captures a plurality of positioning satellites and receives radio waves transmitted from the positioning satellites. The GNSS receiver 2 calculates the distance to the positioning satellites based on the difference between the time of transmission and time of reception of the radio waves and detects the current position of the vehicle 1 (for example, the longitude and latitude of the vehicle 1) based on the distances to the positioning satellites and the positions of the positioning satellites (orbit information). The output of the GNSS receiver 2 is transmitted to the ECU 10, and the ECU 10 acquires the current position of the vehicle 1 from the GNSS receiver 2. Note that GNSS (Global Navigation Satellite System) is an umbrella term for the U.S.' GPS, Russia's GLONASS, Europe's Galileo, Japan's QZSS, China's BeiDou, India's IRNSS, and other satellite positioning systems. That is, the GNSS receiver 2 includes a GPS receiver.

The map database 3 stores map information. The ECU 10 acquires the map information from the map database 3.

The navigation device 4 sets a driving route of the vehicle 1 to a destination based on the current position of the vehicle 1 detected by the GNSS receiver 2, the map information from the map database 3, inputs from the driver, etc. The driving route set by the navigation device 4 is transmitted to the ECU 10. Note that the GNSS receiver 2 and map database 3 may be incorporated in the navigation device 4.

The sensors 5 detect state quantities relating to the vehicle 1 and include a vehicle speed sensor, a gyro sensor, a SOC sensor described later, etc. The outputs of the sensors 5 are transmitted to the ECU 10, and the ECU 10 acquires the state quantities detected by the sensors 5.

The internal combustion engine 6 and the electric motor 7 respectively output power for running use and function as drive devices of the vehicle 1. That is, the vehicle 1 is a hybrid vehicle provided with the internal combustion engine 6 and the electric motor 7 as sources of power for running use. The ECU 10 controls the internal combustion engine 6 and the electric motor 7.

Figure 2:
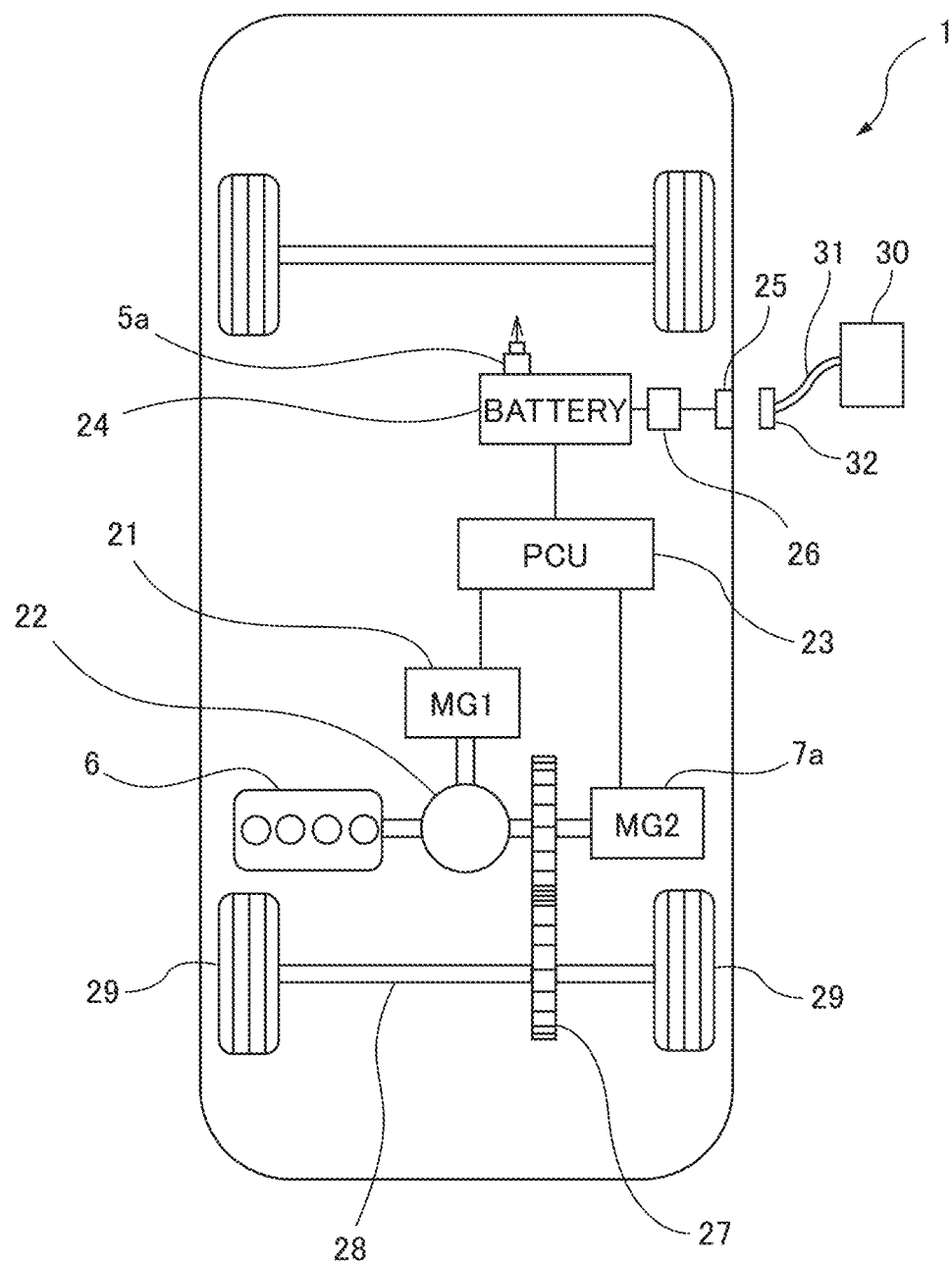
FIG. 2 is a view showing one example of a power train of a vehicle.

FIG. 2 is a view showing one example of a power train of the vehicle 1. As shown in FIG. 2, the vehicle 1 is provided with the internal combustion engine 6, a first motor-generator 21, a power split mechanism 22, a second motor-generator 7a, a power control unit (PCU) 23, a battery 24, and a speed reducer 27.

The internal combustion engine 6 outputs power by burning a mixture of fuel and air inside its cylinders and is, for example, a gasoline engine or a diesel engine. The output shaft (crankshaft) of the internal combustion engine 6 is mechanically connected to the power splitting mechanism 22, and the output of the internal combustion engine 6 is input to the power splitting mechanism 22.

The power splitting mechanism 22 is configured as a known planetary gear mechanism including a sun gear, a ring gear, a pinion gear, and a planetary carrier. The power splitting mechanism 22 distributes the output of the internal combustion engine 6 between the first motor-generator 21 and the speed reducer 27. The output of the internal combustion engine 6 distributed to the speed reducer 27 is transmitted as power for driving use to wheels 29 through an axle 28. Therefore, the internal combustion engine 6 can output power for driving use.

The first motor-generator 21 functions as a generator and a motor. When the first motor-generator 21 functions as a generator, the output of the internal combustion engine 6 is supplied through the power splitting mechanism 22 to the first motor-generator 21. The first motor-generator 21 uses the output of the internal combustion engine 6 to generate electrical power. The electrical power generated by the first motor-generator 21 is supplied through the PCU 23 to at least one of the second motor-generator 7a and the battery 24.

On the other hand, when the first motor-generator 21 functions as a motor, the electrical power stored in the battery 24 is supplied through the PCU 23 to the first motor-generator 21. The output of the first motor-generator 21 is supplied through the power splitting mechanism 22 to the output shaft of the internal combustion engine 6, and the internal combustion engine 6 is cranked.

The second motor-generator 7a functions as a motor and a generator. When the second motor-generator 7a functions as a motor, at least one of the electrical power generated by the first motor-generator 21 and the electrical power stored in the battery 24 is supplied to the second motor-generator 7a. The output of the second motor-generator 7a is supplied to the speed reducer 27, and the output of the second motor-generator 7a supplied to the speed reducer 27 is transmitted as power for driving use to the wheels 29 through the axle 28. Therefore, the second motor-generator 7a can output power for driving use. The second motor-generator 7a is one example of the electric motor 7 in FIG. 1.

On the other hand, when the vehicle 1 is decelerating, the second motor-generator 7a is driven by the rotation of the wheels 29, and the second motor-generator 7a functions as a generator. At this time, so-called regeneration is performed, and the regenerated electrical power generated by the second motor-generator 7a is supplied through the PCU 23 to the battery 24.

The PCU 23 has an inverter, a step-up converter, and a DC-DC converter and is electrically connected to the first motor-generator 21, the second motor-generator 7a, and the battery 24. The PCU 23 converts DC electrical power supplied from the battery 24 to AC electrical power and converts AC electrical power generated by the first motor-generator 21 or the second motor-generator 7a to DC electrical power.

The battery 24 is supplied with the electrical power generated by the first motor-generator 21 using the output of the internal combustion engine 6 and the regenerated electrical power generated by the second motor-generator 7a using regenerated energy. Therefore, the battery 24 can be charged by the output of the internal combustion engine 6 and the regenerated energy. The battery 24 is a lithium-ion battery, a nickel-hydrogen battery, or other secondary battery.

Further, the vehicle 1 is provided with a charging port 25 and a charger 26. The battery 24 can also be charged by an external power source 30. That is, the vehicle 1 shown in FIG. 2 is a so-called plug-in hybrid vehicle (PHV).

The charging port 25 is configured to receive electrical power from the external power source 30 through a charging connector 32 of a charging cable 31. When the battery 24 is charged by the external power source 30, the charging connector 32 is connected to the charging port 25. The charger 26 converts the electrical power supplied from the external power source 30 to electrical power which can be supplied to the battery 24.

Further, an SOC (state of charge) sensor 5a for detecting a state quantity of the battery 24 (voltage, current, etc.) for calculation of the SOC of the battery 24 is provided at the battery 24. The output of the SOC sensor 5a is transmitted to the ECU 10. The ECU 10 acquires the state quantity of the battery 24 and calculates the SOC of the battery 24.

Note that the first motor-generator 21 may be a generator which does not function as a motor. Further, the second motor-generator 7a may be a motor which does not function as a generator. Further, the charging port 25 may be connected to the PCU 23, and the PCU 23 may function as the charger 26.

Control Device of Vehicle

The ECU 10 shown in FIG. 1 is provided at the vehicle 1 and performs various control operations of the vehicle 1. That is, in the present embodiment, the ECU 10 functions as a control device of the vehicle 1 controlling the vehicle 1. Note that, in the present embodiment, a single ECU 10 is provided, but a plurality of ECUs may be provided for the different functions.

As shown in FIG. 1, the ECU 10 includes a communication interface 11, a memory 12, and a processor 13. The communication interface 11, a memory 12, and a processor 13 are connected to each other through signal wires.

The communication interface 11 has an interface circuit for connecting the ECU 10 to an internal vehicle network based on the CAN or other standard. The ECU 10 communicates with other vehicle-mounted equipment such as mentioned above through the communication interface 11.

The memory 12 has, for example, a volatile semiconductor memory (for example, a RAM) and a non-volatile semiconductor memory (for example, a ROM). The memory 12 stores programs to be executed by the processor 13, various data to be used when the processor 13 is executing various processes, etc.

The processor 13 has one or more CPUs (central processing units) and peripheral circuits therefor and executes various processing. Note that the processor 13 may further have a processing circuit such as a logic unit or an arithmetic unit.

Figure 3:
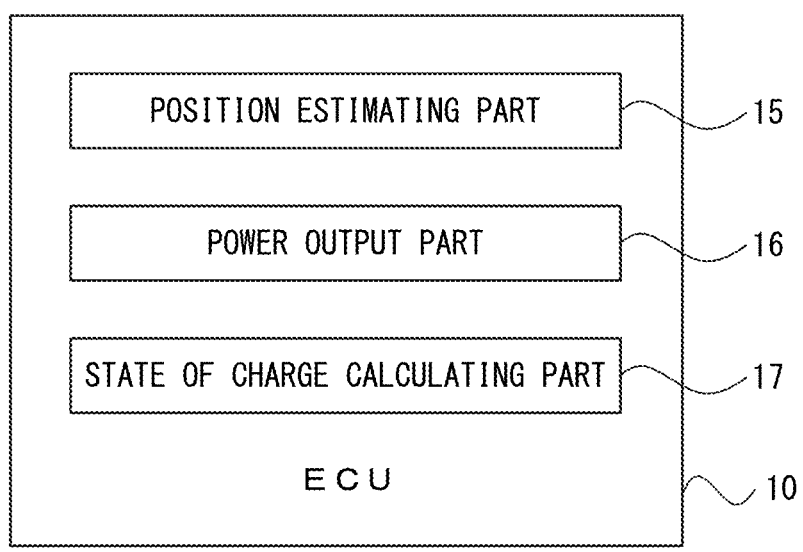
FIG. 3 is a functional block diagram of an ECU of FIG. 1.

FIG. 3 is a functional block diagram of the ECU 10 of FIG. 1. In the present embodiment, the ECU 10 has a position estimating part 15, a power output part 16, and a state of charge calculating part 17. The position estimating part 15, the power output part 16, and the state of charge calculating part 17 are functional modules realized by programs stored in the memory 12 of the ECU 10 being run by the processor 13 of the ECU 10.

The position estimating part 15 estimates the position of the vehicle 1. The power output part 16 controls the internal combustion engine 6 and the electric motor 7 and outputs power for drive use. The state of charge calculating part 17 calculates the SOC of the battery 24.

In the present embodiment, the power output part 16 switches the running mode of the vehicle 1 between the EV mode and the HV mode. In the EV mode, the power output part 16 makes the internal combustion engine 6 stop and drives only the electric motor 7. On the other hand, in the HV mode, the power output part 16 drives at least the internal combustion engine 6. For example, the power output part 16 drives the internal combustion engine 6 and the electric motor 7 in the HV mode so that the SOC of the battery 24 calculated by the state of charge calculating part 17 becomes a target value.

In this regard, in order to curb air pollution, low emission zones (LEZ) which require a vehicle to stop its internal combustion engine when driving through them have been established in locations such as urban areas with large amounts of traffic. In such low emission zones, operating internal combustion engines is banned or restricted. In principle, only vehicles that can travel without emitting exhaust gas (for example, hybrid vehicles, electric cars, fuel cell vehicles, etc.) are allowed to pass. If an internal combustion engine is operated in a low emission zone, a fine or the like is imposed on the driver of the vehicle.

Therefore, when the vehicle 1 is running through such a low emission zone, it is necessary to make the internal combustion engine 6 stop. For this reason, when the position of the vehicle 1 estimated by the position estimating part 15 is inside of the low emission zone, unless the electric power of the battery 24 is insufficient, the power output part 16 makes the internal combustion engine 6 stop and uses only the electric motor 7 to output the drive power for running use. That is, the power output part 16 preferentially selects the EV mode over the HV mode as the running mode in the low emission zone.

As a result, in the low emission zone, the amount of power consumed when running becomes greater and the SOC of the battery 24 falls. For this reason, after the vehicle 1 exits from the low emission zone, it is necessary to operate the internal combustion engine 6 to restore the SOC of the battery 24. However, if internal combustion engines of many vehicles are started up in the vicinity of the boundary of the low emission zone, the noise, exhaust emissions, etc. are liable to have an adverse impact on the environment in the vicinity of the boundary of the low emission zone.

Therefore, in the present embodiment, the power output part 16 determines the startup position of the internal combustion engine 6 when the vehicle 1 exits from the low emission zone so that the startup positions of internal combustion engines are dispersed among a plurality of vehicles in the surroundings of the low emission zone. By doing this, it is possible to keep the startup positions of internal combustion engines from concentrating in the vicinity of the boundary of the low emission zone and in turn keep the environment in the vicinity of the boundary of the low emission zone from being adversely impacted.

For example, the power output part 16 uses a random number to determine the startup position of the internal combustion engine 6 of the vehicle 1 when the vehicle 1 exits from the low emission zone. Due to this, the startup position of the internal combustion engine 6 is randomly determined, and therefore it is possible to keep the internal combustion engine 6 from always being started up in the vicinity of the boundary of the low emission zone.

Engine Operation Processing

Figure 4:
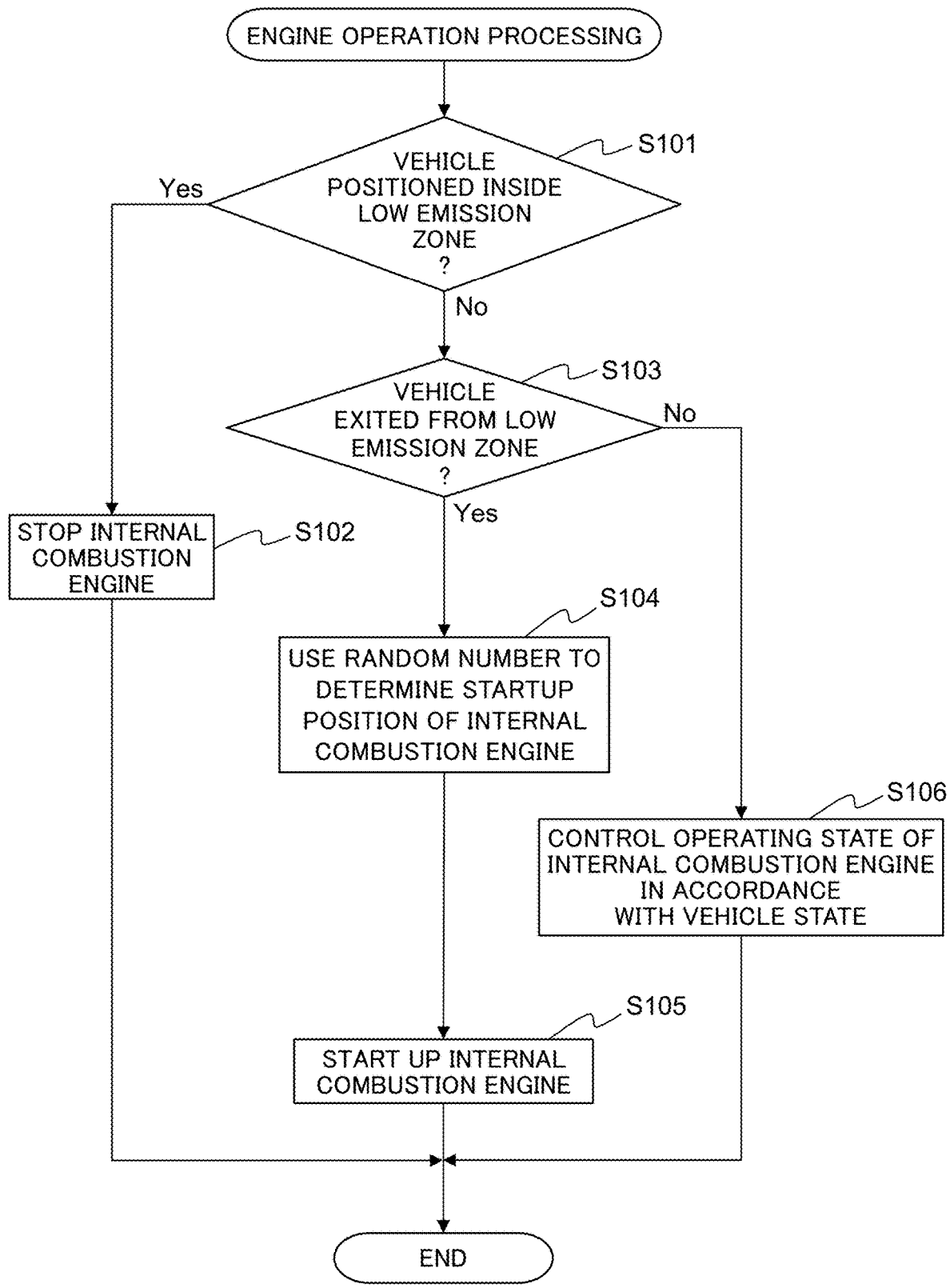
FIG. 4 is a flow chart showing a control routine of engine operation processing in the first embodiment of the present disclosure.

Below, using the flow chart of FIG. 4, the control for determining the operating state of the internal combustion engine 6 of the vehicle 1 will be explained in detail. FIG. 4 is a flow chart showing a control routine of engine operation processing in the first embodiment of the present disclosure. The present control routine is repeatedly performed by the ECU 10.

First, at step S101, based on the output of the GNSS receiver 2 etc., the position estimating part 15 judges whether the vehicle 1 is positioned inside of a low emission zone. For example, the position estimating part 15 uses the output of the GNSS receiver 2, map information of the map database 3, and known self navigation (dead reckoning) to estimate the position of the vehicle 1. In this case, the position estimating part 15 identifies a reference point (base point) on the map based on the output of the GNSS receiver 2 and map information of the map database 3 and calculates the travel distance and travel direction of the vehicle 1 with respect to the reference point based on the outputs of the vehicle speed sensor, the gyro sensor, and other sensors 5 to thereby estimate the position of the vehicle 1. The position information of each low emission zone is stored in the map information of the map database 3. The position estimating part 15 compares the estimated position of the vehicle 1 with the ranges of the low emission zones to judge whether the vehicle 1 is positioned inside of a low emission zone.

If at step S101 it is judged that the vehicle 1 is positioned inside of a low emission zone, the present control routine proceeds to step 102. At step S102, the power output part 16 makes the internal combustion engine 6 stop regardless of the requested output and uses only the electric motor 7 to output power for running use. That is, the power output part 16 sets the running mode of the vehicle 1 to the EV mode. After step S102, the present control routine ends.

On the other hand, if at step S101 it is judged that the vehicle 1 is not positioned inside of a low emission zone, the present control routine proceeds to step S103. At step S103, the position estimating part 15 judges whether the vehicle 1 has exited from a low emission zone. In other words, the position estimating part 15 judges whether the vehicle 1 has traveled from inside of a low emission zone to outside of a low emission zone. This judgment is performed in the same way as step S101 based on the output of the GNSS receiver 2 etc. Note that, if a signal showing that the vehicle 1 has exited from a low emission zone is sent from a device such as a roadside device provided at the exit of the low emission zone, the judgment of step S103 may be performed based on that signal.

If at step S103 it is judged that the vehicle 1 has exited from a low emission zone, the present control routine proceeds to step S104. At step S104, the power output part 16 uses a random number to determine the startup position of the internal combustion engine 6 of the vehicle 1. For example, the power output part 16 generates a random number in a predetermined range and set a position at which a travel distance from the boundary of the low emission zone becomes a distance corresponding to the generated random number to the startup position of the internal combustion engine 6. Note that, the power output part 16 may generate a random number in a predetermined range and set a position which the vehicle 1 reaches when a time period corresponding to the generated random number elapses to the startup position of the internal combustion engine 6.

Next, at step S105, the power output part 16 makes the internal combustion engine 6 start up at the startup position determined at step S104. That is, the power output part 16 switches the running mode of the vehicle 1 from the EV mode to the HV mode at the startup position determined at step S104. After step S105, the present control routine ends.

On the other hand, if at step S103 it is judged that the position of the vehicle 1 is maintained at the outside of the low emission zone, the present control routine proceeds to step S106. At step S106, the power output part 16 controls the operating state of the internal combustion engine 6 in accordance with the vehicle state of the vehicle 1 (requested output, SOC of battery 24, etc.) That is, the power output part 16 selects the running mode of the vehicle 1 in accordance with the vehicle state of the vehicle 1. After step S106, the present control routine ends.

Second Embodiment

The control device of a vehicle according to the second embodiment is basically similar to the control device of a vehicle according to the first embodiment except for the points explained below. For this reason, below, the second embodiment of the present disclosure will be explained focusing on the parts different from the first embodiment.

In the second embodiment, the power output part 16 determines the startup position of the internal combustion engine 6 of the vehicle 1 when the vehicle exits from the low emission zone in accordance with predetermined conditions so that the startup positions of internal combustion engines 6 of a plurality of vehicles are dispersed in the surroundings of the low emission zone. The predetermined conditions include the time or the day of the week when the vehicle 1 exits from the low emission zone, the identification information of the vehicle 1, or the SOC of the battery 24. Due to this, the startup positions of internal combustion engines 6 are dispersed in accordance with the predetermined conditions, and therefore it is possible to keep internal combustion engines 6 from always starting up in the vicinity of the boundary of the low emission zone.

Engine Operation Processing

Figure 5:
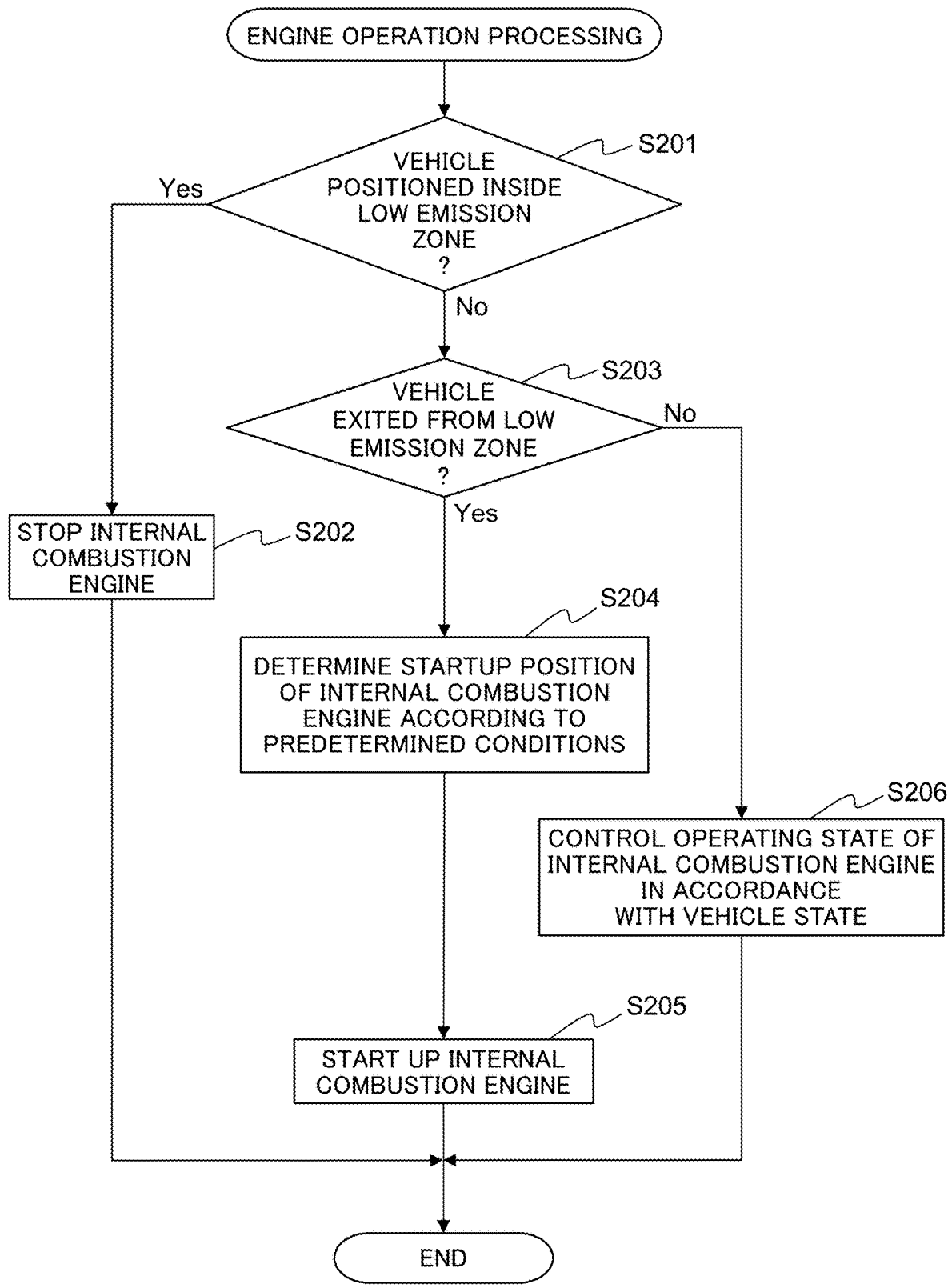
FIG. 5 is a flow chart showing a control routine of engine operation processing in a second embodiment of the present disclosure.

FIG. 5 is a flow chart showing a control routine of engine operation processing in the second embodiment of the present disclosure. The present control routine is repeatedly performed by the ECU 10.

Step S201 to S203 and S206 are similar to steps S101 to S103 and S106 of FIG. 4, and therefore explanations will be omitted. If at step S203 it is judged that the vehicle 1 has exited from low emission zone, the present control routine proceeds to step S204.

At step S204, the power output part 16 determines the startup position of the internal combustion engine 6 of the vehicle 1 in accordance with predetermined conditions. If the predetermined condition is the time when the vehicle 1 exited from the low emission zone, for example, a location differing for each of the hours (6:00 to 9:00 etc.) is assigned in advance as the startup position. In this case, the power output part 16 sets the location assigned to the time when the vehicle 1 exits the low emission zone to the startup position of the internal combustion engine 6.

Further, if the predetermined condition is the day of the week when the vehicle 1 exited from the low emission zone, for example, a location differing for each of the days of the week is assigned in advance as the startup position. In this case, the power output part 16 sets the location assigned to the day of the week when the vehicle 1 exits the low emission zone to the startup position of the internal combustion engine 6.

Further, if the predetermined condition is the identification information of the vehicle 1 (for example, the last number or letter of the license plate, the manufacturer, car model, color, etc.), for example, a location differing for the identification information of the vehicle 1 is assigned in advance as the startup position. In this case, the power output part 16 sets the location assigned for the identification information of the vehicle 1 to the startup position of the internal combustion engine 6. The identification information of the vehicle 1 is stored in the memory 12 of the ECU 10 etc.

Further, if the predetermined condition is the SOC of the battery 24 when the vehicle 1 exits from the low emission zone, for example, the power output part 16 sets the startup position of the internal combustion engine 6 so that the higher the SOC of the battery 24, the longer the distance between the startup position of the internal combustion engine 6 and the boundary of the low emission zone. Note that, a location differing for each range of SOC (0 to 20% etc.) may be assigned in advance as the startup position, and the power output part 16 may set the location assigned for the value of the SOC of the battery 24 when the vehicle 1 exits from the low emission zone to the startup position of the internal combustion engine 6. The SOC of the battery 24 when the vehicle 1 exits from the low emission zone is calculated by the state of charge calculating part 17 based on the output of the SOC sensor 5a etc.

Further, as the location assigned corresponding to a predetermined condition, the position on a road not adjoining a building (for example, a road passing through a forest, fields, barren land, etc.) may be selected. Due to this, the internal combustion engine is started up in a location with few persons, and therefore the effect on persons due to the adverse impact on the environment can be reduced much more.

Next, at step S205, in the same way as step S105 of FIG. 4, the power output part 16 makes the internal combustion engine 6 start up at the startup position determined at step S204. After step S205, the present control routine ends.

Third Embodiment

The control device of a vehicle according to the third embodiment is basically similar to the control device of a vehicle according to the first embodiment except for the points explained below. For this reason, below, the third embodiment of the present disclosure will be explained focusing on the parts different from the first embodiment.

Figure 6:
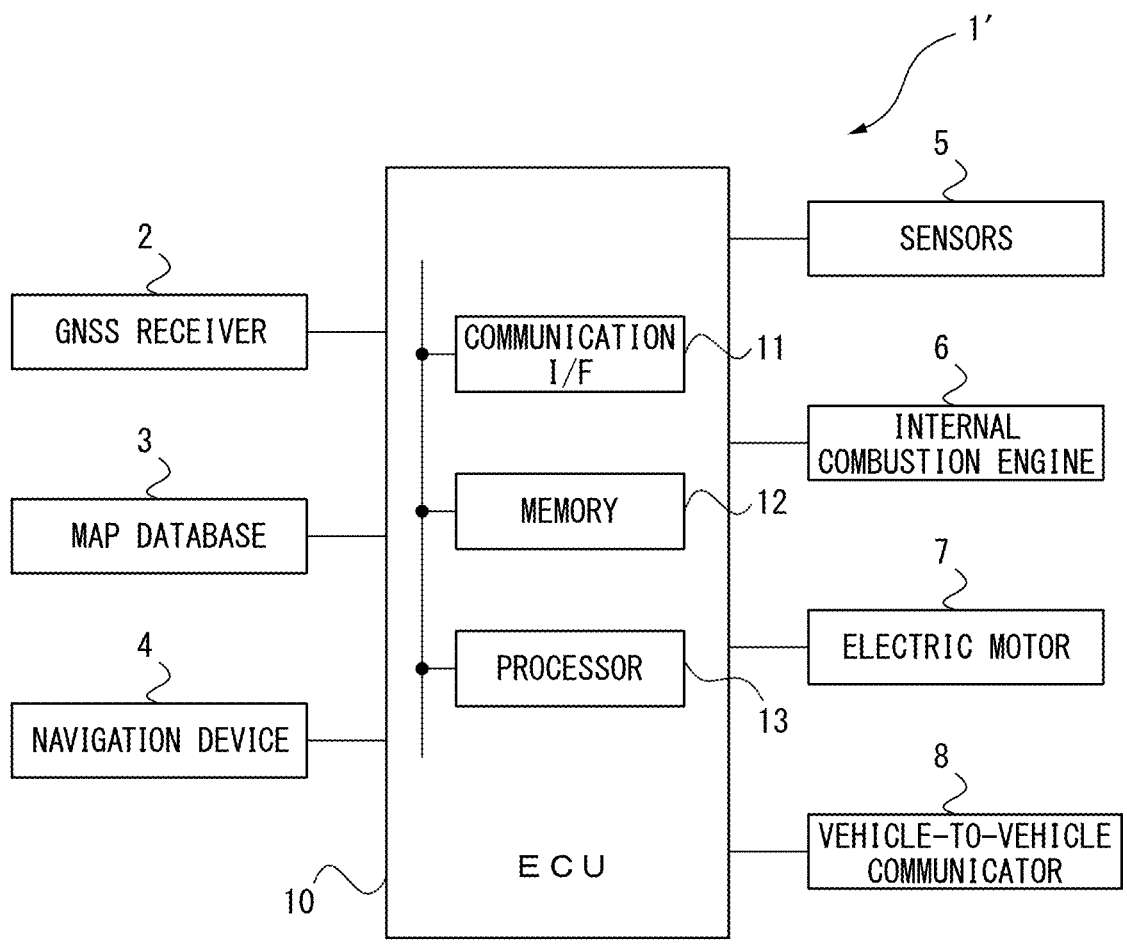
FIG. 6 is a view schematically showing the configuration of a vehicle to which a control device of a vehicle according to a third embodiment of the present disclosure is applied.

FIG. 6 is a view schematically showing the configuration of a vehicle to which the control device of a vehicle according to the third embodiment is applied. As shown in FIG. 6, the vehicle 1' is provided with a vehicle-to-vehicle communicator 8 in addition to a GNSS receiver 2, a map database 3, a navigation device 4, sensors 5, an internal combustion engine 6, an electric motor 7, and an ECU 10. The GNSS receiver 2, the map database 3, the navigation device 4, the sensors 5, the internal combustion engine 6, the electric motor 7, and the vehicle-to-vehicle communicator 8 are connected to be able to communicate with the ECU 10 through an internal vehicle network based on the CAN or other standard.

The vehicle-to-vehicle communicator 8 is a wireless device using a predetermined frequency band (for example the 700 MHz band, 5.8 GHz band, etc.) to enable communication between the vehicle 1' and other vehicles in the surroundings of the vehicle 1'. In the third embodiment, the power output part 16 uses vehicle-to-vehicle communication with other vehicles to determine the startup position of the internal combustion engine 6 of the vehicle 1' when the vehicle 1' exits from the low emission zone so that the startup position of the internal combustion engine 6 does not overlap the startup positions of the internal combustion engines of the other vehicles in the surroundings of the low emission zone. Due to this, the startup positions of the internal combustion engines of the vehicle 1' and the other vehicles are dispersed, and therefore it is possible to keep the startup positions of internal combustion engines from concentrating in the vicinity of the boundary of the low emission zone.

Engine Operation Processing

Figure 7:
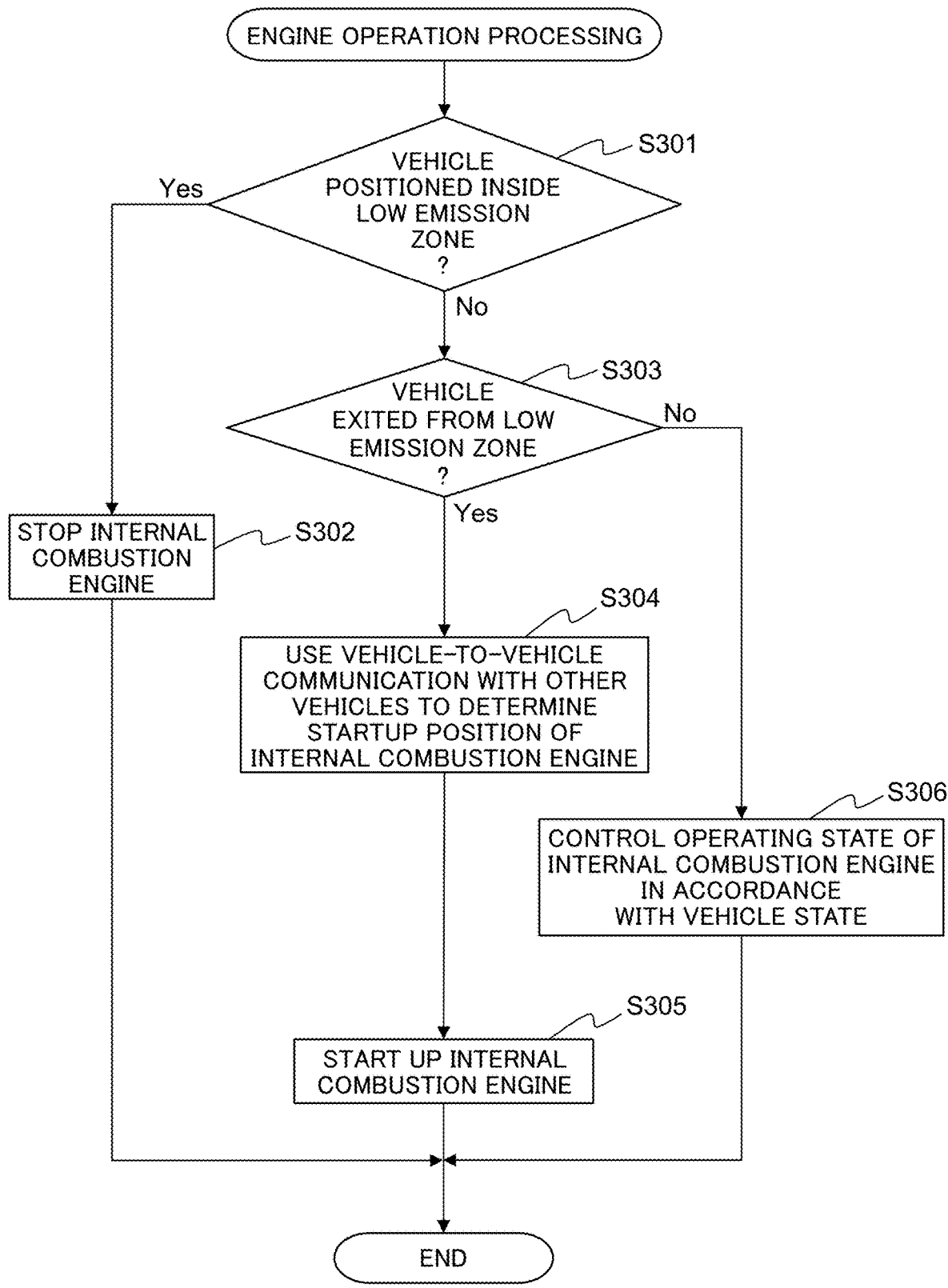
FIG. 7 is a flow chart showing a control routine of engine operation processing in the third embodiment of the present disclosure.

FIG. 7 is a flow chart showing a control routine of engine operation processing in the third embodiment of the present disclosure. The present control routine is repeatedly performed by the ECU 10.

Steps S301 to S303 and S306 are similar to steps S101 to S103 and S106 of FIG. 4, and therefore explanations will be omitted. If at step S303 it is judged that the vehicle 1 has exited from a low emission zone, the present control routine proceeds to step S304.

At step S304, the power output part 16 uses vehicle-to-vehicle communication with the other vehicles to determine the startup position of the internal combustion engine 6 of the vehicle 1' when the vehicle 1' exits from the low emission zone. For example, the power output part 16 acquires the startup positions of the internal combustion engines of the other vehicles by vehicle-to-vehicle communication and sets a position differing from the startup positions of the internal combustion engines of the other vehicles to the startup position of the internal combustion engine 6 of the vehicle 1'.

Note that, the power output part 16 may use vehicle-to-vehicle communication to acquire the SOCs of the batteries of other vehicles and set the startup position of the internal combustion engine 6 of the vehicle 1' so that the higher the SOC of the battery of the vehicle, the longer the distance between the startup position of the internal combustion engine and the boundary of the low emission zone. Further, the power output part 16 may use vehicle-to-vehicle communication to acquire the running routes of other vehicles and set the point where the running route of the vehicle 1' diverges from the running routes of the other vehicles to the startup position of the internal combustion engine 6 of the vehicle 1'.

Next, at step S305, in the same way as step S105 of FIG. 4, the power output part 16 makes the internal combustion engine 6 start up at the startup position determined at step S304. After step S305, the present control routine ends.

Fourth Embodiment

The control device of a vehicle according to the fourth embodiment is basically similar to the control device of a vehicle according to the first embodiment except for the points explained below. For this reason, below, the fourth embodiment of the present disclosure will be explained focusing on the parts different from the first embodiment.

Figure 8:
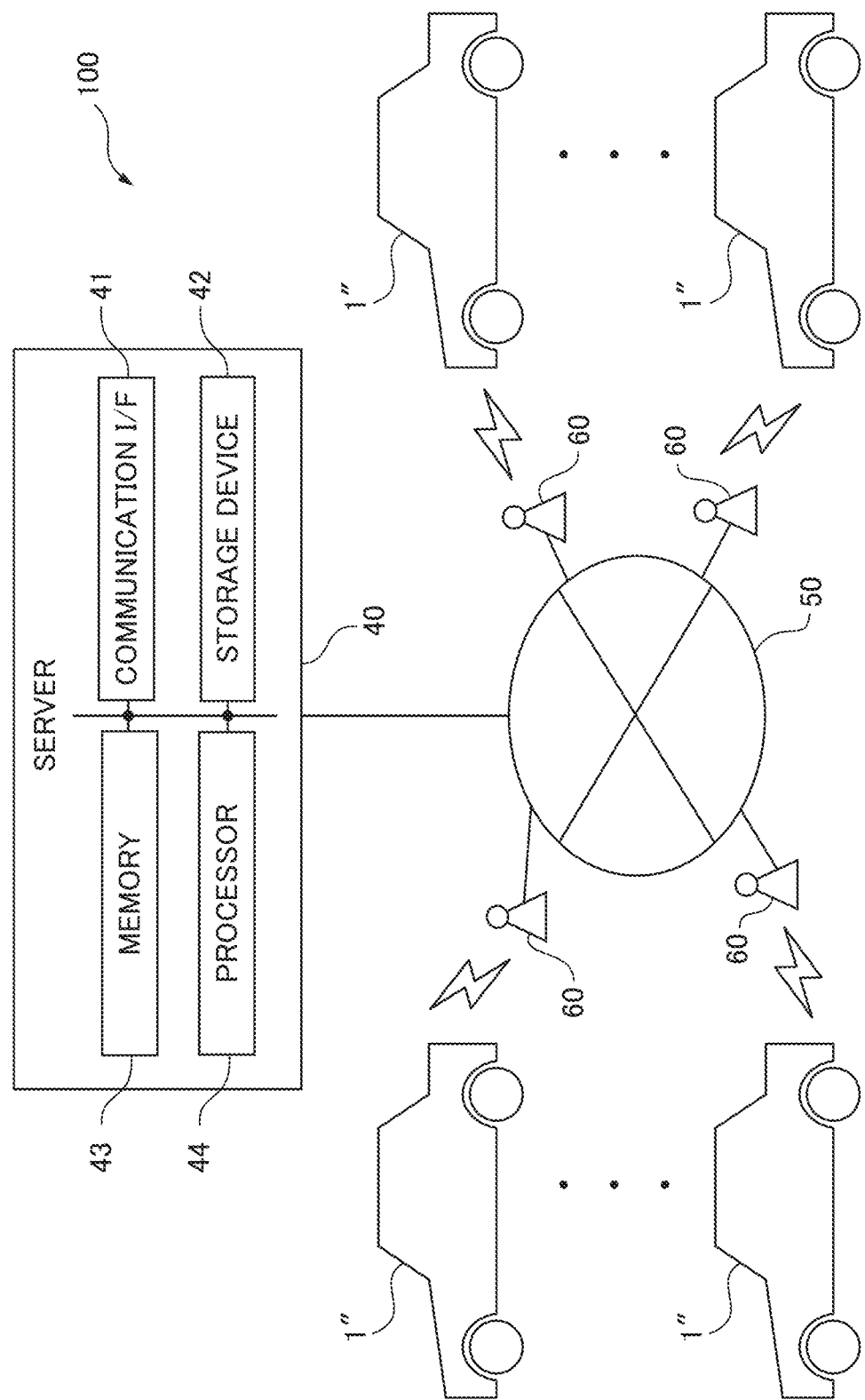
FIG. 8 is a view schematically showing the configuration of a vehicle control system according to a fourth embodiment of the present disclosure.

FIG. 8 is a schematic view of the configuration of a vehicle control system 100 according to the fourth embodiment of the present disclosure. The vehicle control system 100 is provided with a plurality of vehicles 1" and a server 40 able to communicate with the plurality of vehicles 1".

As shown in FIG. 8, the server 40 is provided outside the plurality of vehicles 1" and is provided with a communication interface 41, a storage device 42, a memory 43, and a processor 44. Note that the server 40 may further be provided with input devices such as a keyboard and a mouse, output devices such as a display, etc. Further, the server 40 may be constituted by a plurality of computers. The server 40 is one example of an internal combustion engine control device.

The communication interface 41 is capable of communicating with the plurality of vehicles 1" and enables the server 40 to communicate with the plurality of vehicles 1". Specifically, the communication interface 41 has an interface circuit for connecting the server 40 to a communication network 50. The server 40 communicates with the plurality of vehicles 1" through the communication interface 41, the communication network 50, and a wireless base station 60. The communication interface 41 is one example of a communication device.

The storage device 42 has, for example, a hard disk drive (HDD), a solid state drive (SSD), an optical recording medium, etc. The storage device 42 stores various data and stores, for example, computer programs by which the processor 44 executes various processing.

The memory 43 has, for example, a semiconductor memory such as a random access memory (RAM). The memory 43 stores, for example, various data to be used when various processing are executed by the processor 44.

The communication interface 41, the storage device 42, and the memory 43 are connected to the processor 44 through signal wires. The processor 44 has one or more CPUs and peripheral circuits therefor and executes various processing. Note that the processor 44 may further have a processing unit such as a logic unit or an arithmetic unit. The processor 44 is one example of a control device.

Figure 9:
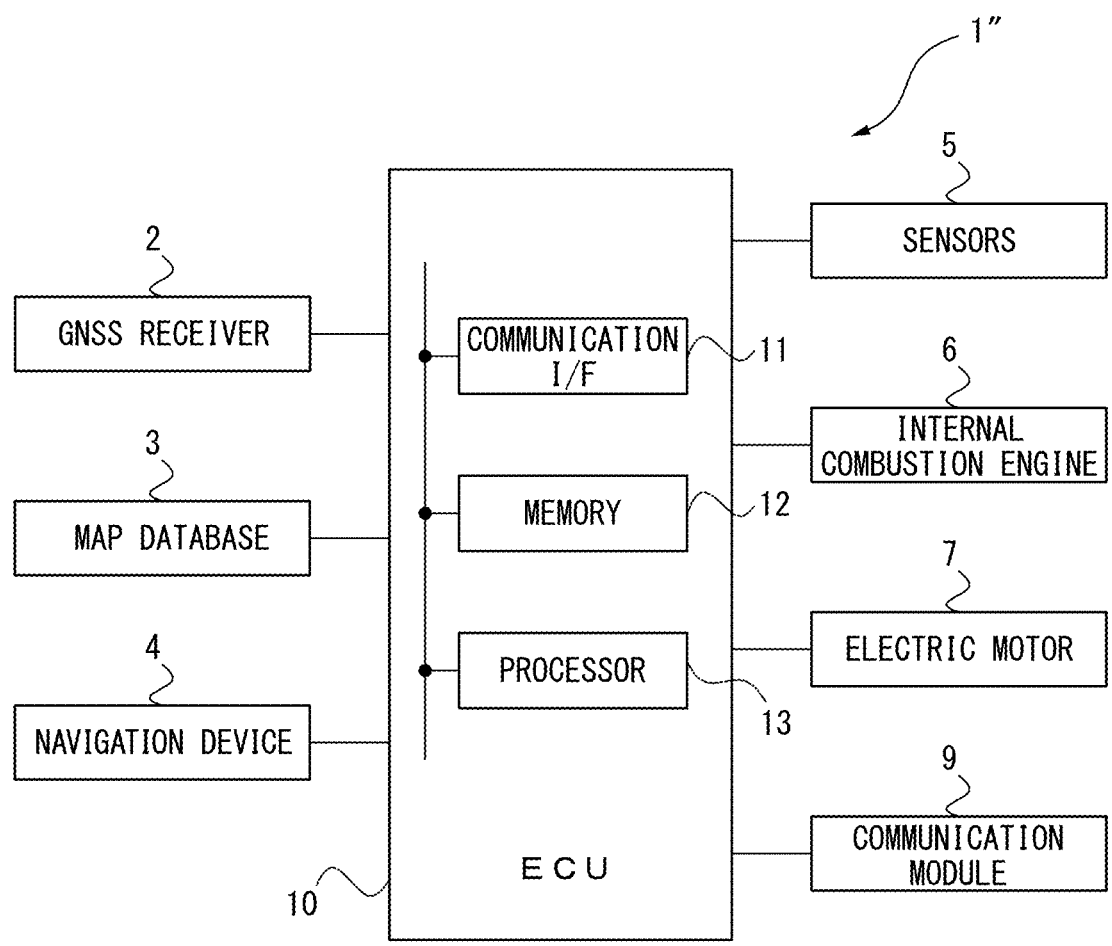
FIG. 9 is a view schematically showing the configuration of the vehicle of FIG. 8.

FIG. 9 is a view schematically showing the configuration of the vehicle 1" of FIG. 8. As shown in FIG. 9, the vehicle 1" is provided with a communication module 9 in addition to the GNSS receiver 2, the map database 3, the navigation device 4, the sensors 5, the internal combustion engine 6, the electric motor 7, and the ECU 10. The GNSS receiver 2, the map database 3, the navigation device 4, the sensors 5, the internal combustion engine 6, the electric motor 7, and the communication module 9 are connected to be able to communicate with the ECU 10 through an internal vehicle network based on the CAN or other standard.

The communication module 9 is a wireless device using a predetermined frequency band (for example, the 800 MHz band, 2.4 GHz band, etc.) to enable communication between the vehicle 1" and the outside of the vehicle 1" (for example, the server 40). The communication module 9, for example, is a data communication module (DCM) able to communicate with the communication network 50 through the wireless base station 60. The communication module 9 is one example of a communication device able to communicate with the server 40. Note that, as such a communication device, a portable terminal (for example, a smartphone, tablet terminal, etc.) electrically connected with the vehicle 1" (in particular, the ECU 10) may be used.

In the fourth embodiment, the processor 44 of the server 40 determines the startup positions of the internal combustion engines 6 when a plurality of vehicles 1" exit from the low emission zone so that the startup positions of the internal combustion engines 6 are dispersed in the surroundings of the low emission zone among the plurality of vehicles 1" and transmits the startup positions as control commands through the communication interface 41 to the plurality of vehicles 1". On the other hand, the power output part 16 of the vehicle 1" determines the startup position of the internal combustion engine 6 of the vehicle 1" when the vehicle 1" exits from the low emission zone in accordance with the control command from the server 40. By doing this, it is possible to keep the startup positions of internal combustion engines 6 from concentrating in the vicinity of the boundary of the low emission zone and in turn keep the environment in the vicinity of the boundary of the low emission zone from being adversely impacted.

Figure 10:
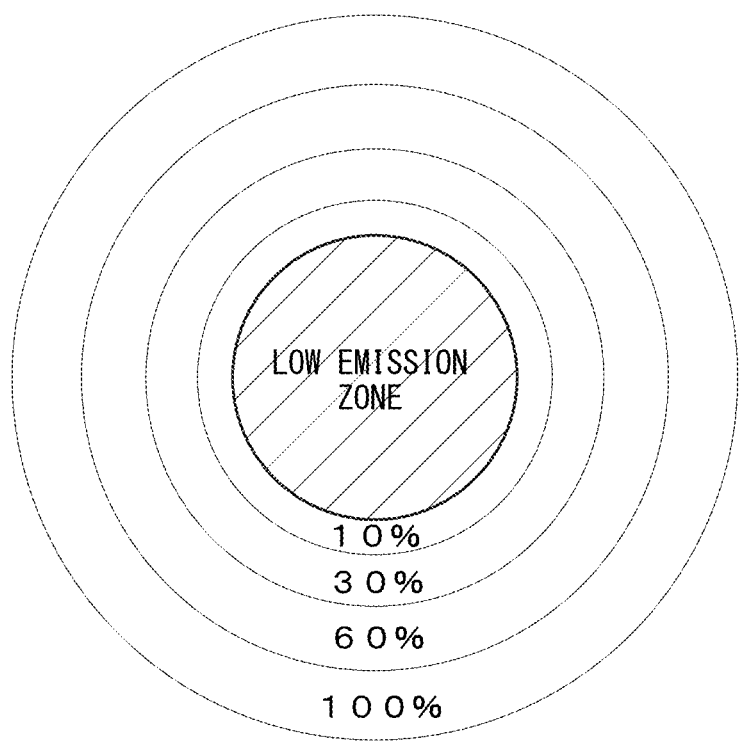
FIG. 10 is a view schematically showing one example of a ratio of vehicles whose internal combustion engines have finished being started up in the surroundings of a low emission zone.

For example, the processor 44 of the server 40 determines the startup position of the internal combustion engine 6 when each of the plurality of vehicles 1" exits from the low emission zone so that the further the position from the boundary of the low emission zone in the surroundings of the low emission zone, the higher the ratio of the vehicles 1" whose internal combustion engines have finished being started up among the vehicles 1" exiting from the low emission zone. FIG. 10 is a view schematically showing one example of the ratio of vehicles whose internal combustion engines have finished being started up in the surroundings of the low emission zone. As shown in FIG. 10, by making the ratio of vehicles whose internal combustion engines have finished being started up higher the further the positions of the vehicles from the boundary of the low emission zone (hatched part), it is possible to keep the startup positions of the internal combustion engines from concentrating in a narrow region in the vicinity of the boundary of the low emission zone.

Startup Position Determining Processing

Figure 11:
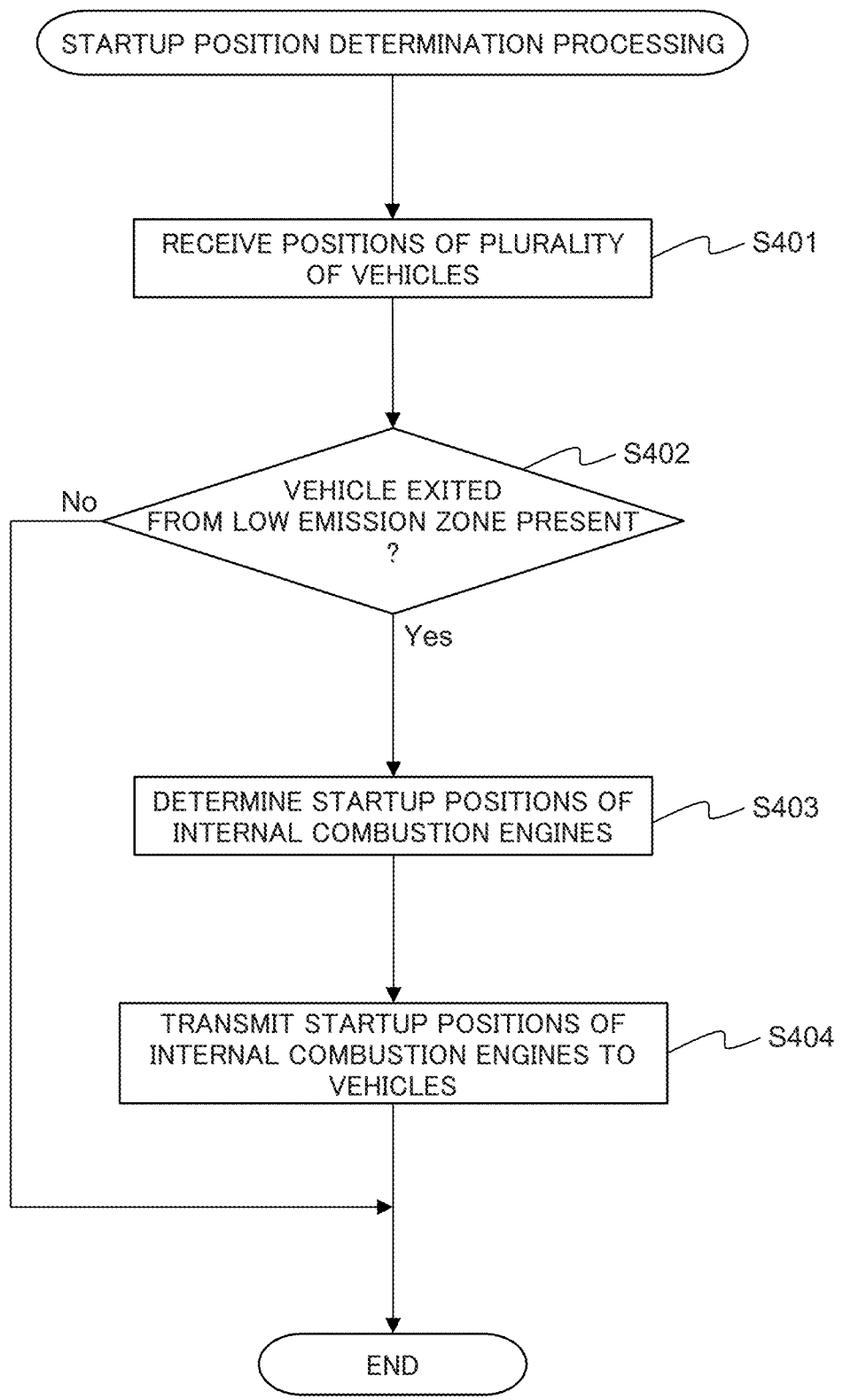
FIG. 11 is a flow chart showing a control routine of startup position determining processing in the fourth embodiment of the present disclosure.

FIG. 11 is a flow chart showing a control routine of startup position determining processing in the fourth embodiment of the present disclosure. The present control routine is repeatedly performed by the processor 44 of the server 40.

First, at step S401, the processor 44 receives positions of vehicles 1" from a plurality of vehicles 1" through the wireless base station 60, the communication network 50, and the communication interface 41. The positions of the vehicles 1" are estimated by the position estimating parts 15 of the vehicles 1".

Next, at step S402, the processor 44 judges whether there is a vehicle 1" which has exited from the low emission zone based on the time change of the positions of the plurality of vehicles 1". If it is judged that there is no vehicle 1" which has exited from the low emission zone, the present control routine ends. On the other hand, if it is judged that there is a vehicle 1" which has exited from the low emission zone, the present control routine proceeds to step S403. Note that, if a signal showing that a vehicle 1" is exiting the low emission zone is sent from a device such as a roadside device provided at the exit of the low emission zone, the judgment of step S403 may be performed based on that signal.

At step S403, the processor 44 determines the startup position of the internal combustion engine 6 of the vehicle 1" exiting from the low emission zone. For example, the processor 44 determines the startup position of the internal combustion engine 6 of the vehicle 1" so that the further the position from the boundary of the low emission zone in the surroundings of the low emission zone, the higher the ratio of the vehicles 1" whose internal combustion engines 6 have finished being started up among the vehicles 1" exiting from the low emission zone.

Note that, the processor 44, in the same way as step S104 of FIG. 4, may use a random number to determine the startup position of the internal combustion engine 6 of the vehicle 1". Further, the processor 44 may acquire the SOC of the battery 24 of the vehicle 1" and set the startup position of the internal combustion engine 6 so that the higher the SOC of the battery 24, the longer the distance between the startup position of the internal combustion engine 6 and the boundary of the low emission zone.

Next, at step S404, the processor 44 transmits the startup position of the internal combustion engine 6 determined at step S403 to the vehicle 1" exiting from the low emission zone as a control command. After step S404, the present control routine ends.

Engine Operation Processing

Figure 12:
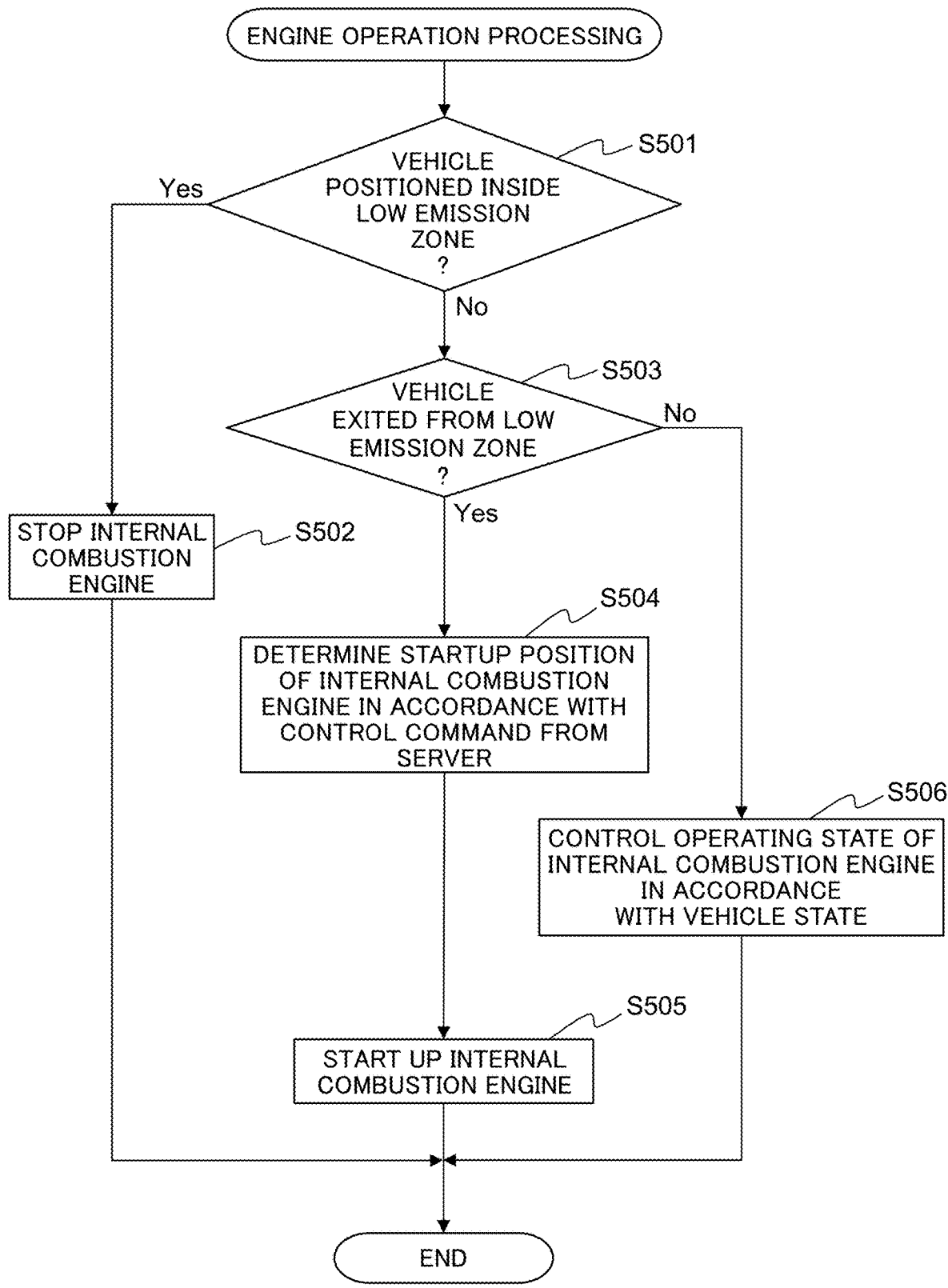
FIG. 12 is a flow chart showing a control routine of engine operation processing in the fourth embodiment of the present disclosure.

FIG. 12 is a flow chart showing a control routine of engine operation processing in the fourth embodiment of the present disclosure. The present control routine is repeatedly performed by the ECU 10 of the vehicle 1".

Steps S501 to S503 and S506 are similar to steps S101 to S103 and S106 of FIG. 4, and therefore explanations will be omitted. If at step S503 it is judged that the vehicle 1 has exited from a low emission zone, the present control routine proceeds to step S504.

At step S504, the power output part 16 receives a control command from the server 40 through the communication network 50, the wireless base station 60, and the communication module 9 and determines the startup position of the internal combustion engine 6 of the vehicle 1" in accordance with the control command.

Next, at step S505, in the same way as step S105 of FIG. 4, the power output part 16 makes the internal combustion engine 6 start up at the startup position determined at step S504. After step S505, the present control routine ends.

Fifth Embodiment

The control device of a vehicle according to the fifth embodiment is basically similar to the control device of a vehicle according to the first embodiment except for the points explained below. For this reason, below, the fifth embodiment of the present disclosure will be explained focusing on the parts different from the first embodiment.

As explained above, inside of a low emission zone, the amount of electric power consumed when running becomes greater and the SOC of the battery 24 falls. For this reason, it is preferable to use the internal combustion engine 6 to charge the battery 24 in advance before the vehicle 1 enters the low emission zone. However, if many vehicles continue to operate their internal combustion engines in the vicinity of the boundary of the low emission zone, the noise, exhaust emissions, etc. are liable to adversely impact the environment in the vicinity of the boundary of the low emission zone.

Therefore, in the present embodiment, the power output part 16 determines the stopping position of the internal combustion engine 6 when the vehicle 1 enters a low emission zone so that the stopping positions of internal combustion engines are dispersed in the surroundings of the low emission zone among a plurality of vehicles. By doing this, it is possible to keep the stopping positions of internal combustion engines from concentrating in the vicinity of the boundary of the low emission zone and in turn keep the environment in the vicinity of the boundary of the low emission zone from being adversely impacted even more.

Engine Operation Processing

FIG. 13 is a flow chart showing a control routine of engine operation processing in a fifth embodiment of the present disclosure. The present control routine is repeatedly performed by the ECU 10.

Steps S601 to S605 are similar to steps S101 to S105 of FIG. 4, and therefore explanations will be omitted. If at step S603 it is judged that the position of the vehicle 1 is maintained at the outside of a low emission zone, the present control routine proceeds to step S606.

At step S606, the position estimating part 15 judges whether the vehicle 1 will enter a low emission zone. In other words, the position estimating part 15 judges whether the vehicle 1 is scheduled to travel from outside of a low emission zone to inside of a low emission zone. For example, the position estimating part 15 judges whether the vehicle 1 will enter a low emission zone based on the running route set by the navigation device 4. In this case, it is judged that the vehicle 1 will enter a low emission zone if the running route includes the low emission zone.

If at step S606 it is judged that the vehicle 1 will enter a low emission zone, the present control routine proceeds to step S607. At step S607, the power output part 16 determines the stopping position of the internal combustion engine 6 of the vehicle 1. For example, the power output part 16 sets the position where the SOC of the battery 24 reaches a predetermined value to the stopping position of the internal combustion engine 6. The predetermined value is set in advance or is calculated based on a predicted electric power consumption in the low emission zone. The predicted electric power consumption in the low emission zone is, for example, calculated based on a running route set by the navigation device 4, the past running history of the vehicle 1, etc.

Note that, the power output part 16 may use a random number to determine the stopping position of the internal combustion engine 6. For example, the power output part 16 generates a random number in a predetermined range and sets a position where a running distance to the boundary of the low emission zone becomes a distance corresponding to the generated random number to the stopping position of the internal combustion engine 6. Note that, the power output part 16 may generate a random number in a predetermined range and set a position when a time period corresponding to the generated random number elapses to the stopping position of the internal combustion engine 6.

Further, the power output part 16 may determine the stopping position of the internal combustion engine 6 in accordance with predetermined conditions. If the predetermined condition is the time when the vehicle 1 enters the low emission zone, for example, a location differing for the hours (6:00 to 9:00 etc.) is assigned as the stopping position. In this case, the power output part 16 sets the location assigned for the hours when the vehicle 1 entered the low emission zone to the stopping position of the internal combustion engine 6.

Further, if the predetermined condition is the day of the week when the vehicle 1 enters the low emission zone, for example, a location differing for each day of the week is assigned as the stopping position. In this case, the power output part 16 sets the location assigned for the day of the week when the vehicle 1 exits the low emission zone to the stopping position of the internal combustion engine 6.

Further, if the predetermined condition is identification information of the vehicle 1 (for example, the last number or letter of the license plate, the manufacturer, car model, color, etc.), for example, a location differing for the identification information of the vehicle 1 is assigned in advance as the stopping position. In this case, the power output part 16 sets the location assigned for the identification information of the vehicle 1 to the stopping position of internal combustion engine 6. The identification information of the vehicle 1 is stored in the memory 12 of the ECU 10 etc.

Next, at step S608, the power output part 16 makes the internal combustion engine 6 stop at the stopping position determined at step S607. That is, the power output part 16 switches the running mode of the vehicle 1 from the HV mode to the EV mode at the stopping position determined at step S607. After step S608, the present control routine ends.

On the other hand, if at step S606 it is judged that the vehicle 1 will not enter a low emission zone, the present control routine proceeds to step S609. At step S609, in the same way as step S106 of FIG. 4, the power output part 16 controls the operating state of the internal combustion engine 6 in accordance with the vehicle state of the vehicle 1 (requested output, SOC of battery 24, etc.) After step S609, the present control routine ends.

Other Embodiments

Above, preferred embodiments according to the present disclosure were explained, but the present disclosure is not limited to these embodiments. Various modifications and changes can be made within the language of the claims.

For example, the charging port 25 and the charger 26 may be omitted from the vehicle 1, 1', 1". That is, the vehicle 1, 1', 1" may be a type of hybrid vehicle for which the battery 24 is not charged by an external power source. Further, while the vehicle 1 shown in FIG. 2 is a so-called series-parallel type of hybrid vehicle, the vehicle 1, 1', 1" may be a series type, a parallel type, or other type of hybrid vehicle so long as the hybrid vehicle can drive without operating the internal combustion engine.

Further, the power output part 16 may make the internal combustion engines 6 of the vehicles 1, 1', 1" start up when the vehicles 1, 1', 1" exit from a low emission zone, then make the outputs of the internal combustion engines 6 gradually increase. Due to this, the positions where the outputs of the internal combustion engines 6 become greater after startup of the internal combustion engines 6 are dispersed at locations away from the boundary of the low emission zone, and therefore it is possible to keep the environment in the vicinity of the boundary of the low emission zone from being adversely impacted even more.

Further, the above embodiments can be worked freely combined. For example, if the control routine of FIG. 13 is performed, instead of steps S604 and S605, steps S204 and S205 of FIG. 5, steps S304 and S305 of FIG. 7, or steps S504 and S505 of FIG. 12 may be performed.

Further, the processor 44 of the server 40 may determine the stopping position of the internal combustion engine 6 when each of a plurality of vehicles 1" enters a low emission zone so that the stopping positions of the internal combustion engines 6 of the plurality of vehicles 1" are dispersed at the surroundings of the low emission zone and transmit the stopping position as a control command through the communication interface 41 to each of the plurality of vehicles 1". In this case, the power output part 16 of the vehicle 1" determines the stopping position of the internal combustion engine 6 of the vehicle 1" when the vehicle 1" enters the low emission zone in accordance with the control command from the server 40. By doing this, it is possible to keep the stopping positions of internal combustion engines 6 from concentrating in the vicinity of the boundary of the low emission zone and in turn keep the environment in the vicinity of the boundary of the low emission zone from being adversely impacted.

REFERENCE SIGNS LIST 1, 1', 1" vehicle
6 internal combustion engine
7 electric motor
10 electronic control unit (ECU)
15 position estimating part
16 power output part
24 battery

The invention claimed is:

1. A control device installed in a vehicle, wherein the vehicle is provided with an internal combustion engine, an electric motor, and a battery, and the control device is configured to control the vehicle, the control device comprising a processor configured to:
   estimate a position of the vehicle; and
   control the internal combustion engine and the electric motor to output power for vehicle running,
   wherein
   the processor is configured to determine a startup position of the internal combustion engine of the vehicle when the vehicle exits from a low emission zone requesting the internal combustion engine be stopped so that startup positions of internal combustion engines of a plurality of vehicles are dispersed at surroundings outside of the low emission zone, and
   the processor is configured to generate a random number corresponding to a predetermined distance from a boundary of the low emission zone to determine the startup position of the internal combustion engine of the vehicle when the vehicle exits from the low emission zone.

2. The control device of a vehicle according to claim 1, wherein the processor is configured to make the internal combustion engine of the vehicle start up when the vehicle exits from the low emission zone, then gradually make an output of the internal combustion engine increase.

3. The control device of a vehicle according to claim 1, wherein the processor is configured to determine a stopping position of the internal combustion engine of the vehicle when the vehicle enters the low emission zone so that stopping positions of internal combustion engines of a plurality of vehicles are dispersed at surroundings inside of the low emission zone.

4. An internal combustion engine control device, comprising:
   a communication device configured to communicate with a plurality of vehicles; and
   a processor,
   wherein
   each of the plurality of vehicles comprises an internal combustion engine, an electric motor, and a battery, and
   the processor is configured to determine a startup position of the internal combustion engine when each of the plurality of vehicles exits from a low emission zone requesting the internal combustion engines be stopped so that the startup positions of the internal combustion engines of the plurality of vehicles are dispersed at surroundings outside of the low emission zone and transmit the startup position as a control command through the communication device to each of the plurality of vehicles,
   the processor is configured to determine the startup position of the internal combustion engine when each of the plurality of vehicles exits from the low emission zone so that in the surroundings outside of the low emission zone, the further away a position from a boundary of the low emission zone, the higher a ratio of vehicles whose internal combustion engines have finished being started up among the vehicles exiting from the low emission zone.

* * * * *